US009604683B2

(12) United States Patent
Kunsch et al.

(10) Patent No.: US 9,604,683 B2
(45) Date of Patent: Mar. 28, 2017

(54) REAR ENGINE, FRONT WHEEL DRIVE THREE WHEELED VEHICLE

(71) Applicants: Gregory W Kunsch, Virginia Beach, VA (US); Alexander Andre Kunsch, Virginia Beach, VA (US)

(72) Inventors: Gregory W Kunsch, Virginia Beach, VA (US); Alexander Andre Kunsch, Virginia Beach, VA (US)

(*) Notice: Subject to any disclaimer, the term of this patent is extended or adjusted under 35 U.S.C. 154(b) by 0 days.

(21) Appl. No.: 14/752,971

(22) Filed: Jun. 28, 2015

(65) Prior Publication Data

US 2016/0375944 A1     Dec. 29, 2016

(51) Int. Cl.
B62D 61/06 (2006.01)
B60N 2/01 (2006.01)
B60K 5/00 (2006.01)

(52) U.S. Cl.
CPC .............. B62D 61/065 (2013.01); B60K 5/00 (2013.01); B60N 2/01 (2013.01); B62D 61/06 (2013.01); B60K 2005/003 (2013.01)

(58) Field of Classification Search
CPC .... B62D 61/06; B62D 61/065; B62D 31/003; B60K 5/00; B60K 2005/003; B60N 2/01
See application file for complete search history.

(56) References Cited

U.S. PATENT DOCUMENTS

| 1,989,995 | A |   | 2/1935 | Martin |   |
|---|---|---|---|---|---|
| 2,038,843 | A |   | 4/1936 | Jones |   |
| 2,306,042 | A | * | 12/1942 | Custer | B62D 61/08 180/214 |
| 2,434,759 | A |   | 1/1948 | Donovan |   |
| 2,740,486 | A |   | 4/1956 | Wayman |   |
| 2,851,302 | A |   | 9/1958 | Owen |   |
| 3,610,358 | A |   | 10/1971 | Korff |   |
| 3,640,545 | A | * | 2/1972 | Citroen | B60G 11/00 180/210 |
| 3,826,326 | A |   | 7/1974 | Blair |   |
| 4,020,914 | A |   | 5/1977 | Trautwein |   |
| 4,353,567 | A |   | 10/1982 | Weldy |   |
| 4,373,600 | A |   | 2/1983 | Buschbom et al. |   |
| 4,377,215 | A |   | 3/1983 | Hare |   |
| 4,448,278 | A |   | 5/1984 | Badsey |   |
| 4,453,763 | A |   | 6/1984 | Richards |   |
| 4,573,546 | A |   | 3/1986 | Irimajiri et al. |   |
| 4,625,825 | A | * | 12/1986 | Ethier | B62D 61/065 180/215 |
| 4,630,702 | A | * | 12/1986 | Irimajiri | B60K 20/04 180/215 |

(Continued)

OTHER PUBLICATIONS

Author: Elvis Payne, Three Wheelers.Com-query : Manufactures with 2 Wheels in Front Web site link: http://www.3wheelers.com/ ; Database Query : Wheel Configuration ='2F1R' or 'Both' Date: Jun. 21, 2015.

(Continued)

Primary Examiner — Faye M Fleming

(57) ABSTRACT

The general layout for a front wheel drive, three-wheeled vehicle designed for road use with two steerable driven wheels in the front of the vehicle, and the engine located behind the front of the passenger seating. The vehicle layout is designed for optimal stability and traction by the location of the passenger seating, engine or engines, steering and driven wheels.

1 Claim, 5 Drawing Sheets

Drawing 2

Embodiment:
-Dual passenger, side by side seating
-Single Engine

Side View

Front of Engine located behind front of Seat

D - Rear Wheel
C - Engine
B - Passenger Seats
A - Front Wheels - Driven, Steering

A - Front Wheels - Driven, Steering
B - Passenger Seats
C - Engine
D - Rear Wheel Plan View ← Front of Vehicle Front of Engine located behind front of Seat

(56) References Cited

U.S. PATENT DOCUMENTS

| | | | |
|---|---|---|---|
| 4,662,468 A * | 5/1987 | Ethier | B62D 61/065 |
| | | | 180/211 |
| 4,697,663 A | 10/1987 | Trautwein | |
| 4,703,824 A * | 11/1987 | Irimajiri | B62D 61/065 |
| | | | 180/210 |
| 4,717,164 A * | 1/1988 | Levavi | B60G 17/00 |
| | | | 180/210 |
| 4,787,470 A | 11/1988 | Badsey | |
| 4,919,225 A | 4/1990 | Sturges | |
| 5,116,069 A | 5/1992 | Miller | |
| 5,236,060 A | 8/1993 | Huber | |
| 5,248,011 A | 9/1993 | Richards | |
| 5,307,889 A * | 5/1994 | Bohannan | B62D 51/008 |
| | | | 180/13 |
| 5,431,243 A | 7/1995 | Richards | |
| 5,433,285 A | 7/1995 | Richards | |
| 5,495,905 A | 3/1996 | Fini, Jr. | |
| 5,806,622 A | 9/1998 | Murphy | |
| 5,927,424 A | 7/1999 | Van Den Brink et al. | |
| 6,641,154 B1 | 11/2003 | Vey | |
| 7,090,234 B2 | 8/2006 | Takayanagi et al. | |
| 7,185,900 B2 | 3/2007 | Bogatay, Sr. et al. | |
| 7,445,070 B1 | 11/2008 | Pickering | |
| 7,464,781 B2 | 12/2008 | Guay et al. | |
| D584,188 S | 1/2009 | Jenkins et al. | |
| 7,543,672 B2 | 6/2009 | Codere et al. | |
| 7,549,494 B1 | 6/2009 | Zichek | |
| 7,588,110 B2 | 9/2009 | Martino | |
| 8,540,045 B2 * | 9/2013 | Hall | B60G 3/20 |
| | | | 180/210 |
| 8,544,587 B2 | 10/2013 | Holroyd | |
| 8,646,794 B2 | 2/2014 | Mullin | |
| 8,662,228 B2 | 3/2014 | Hill | |
| 8,695,746 B2 | 4/2014 | Holroyd | |
| 8,781,684 B2 | 7/2014 | Bruce | |
| 8,840,131 B1 | 9/2014 | Calley | |
| 9,221,508 B1 * | 12/2015 | de Haan | B60N 2/005 |
| 2005/0212329 A1 * | 9/2005 | Gillies De Landeta | B62D 21/186 |
| | | | 296/190.07 |
| 2013/0056287 A1 | 3/2013 | Park | |
| 2014/0217714 A1 * | 8/2014 | Sekiya | B62D 21/04 |
| | | | 280/781 |

OTHER PUBLICATIONS

Unknown Author, Wikipedia : Three Wheeled Vehicles with Two Front Wheels Web site link: http://en.wikipedia.org/wiki/Three-wheeler#Examples Date: Jun. 21, 2015.

Author. Elvis Payne, Three Wheelers.Com-query : Manufactures with 2 Wheels in Front Web site link: http://www.3wheelers.com/ ; Database Query : Wheel Configuration ='2F1R' or 'Both' Date: Jun. 21, 2015.

Unknown Author, web page image of LaBolle vehicle, Jun. 27, 2015, one page Web Link: http://thegegeblog.canalblog.com/archives/2010/04/01/17439628.html.

Unknown Author, web page Wikipedia Griffon vehicle, Jun. 27, 2015, one page Web Link: https://de.wikipedia.org/wiki/%C3%89tablissements_Griffon.

Unknown Author, web page AC History, Jun. 27, 2015, two pages Web Link: http://www.uniquecarsandparts.com.au/heritage_ac.php.

Unknown Author, web page Searching for lost Indians, Jun. 27, 2015, two pages Web Link: https://touringroads.wordpress.com/2013/10/05/searching-for-lost-indians-an-archival-journey/.

Elvis Payne, web page Asia, Jun. 27, 2015, One page Web Link: http://www.3wheelers.com/aisa.html.

Elvis Payne, web page A.F.Cars, Jun. 27, 2015, One page Web Link: http://www.3wheelers.com/afcars.html.

Unknown Author, web page, Welcome to the home of Doug Malewicki's Inventions, engineering projects and fun stuff. Jun. 27, 2015, two pages Web Link: http://www.canosoarus.com/.

Unknown Author, web page Welcome to BRA Motorworks, Jun. 27, 2015, one page Web Link: http://www.bra-cars.com/.

Hanlon, Mike, the three-wheeled driving machine, Gizmag, Jan. 21, 2005, 4 pages Web link: http://www.gizmag.com/go/3628/.

Unknown Author, web page Home=>Concept Cars, Jun. 27, 2015, one page Web Link: http://www.diseno-art.com/encyclopedia/concept_cars/aprilia_magnet.html.

Hanlon, Mike, VW's 3-wheel sportcar, Gizmag, Jan. 5, 2006, 4 pages Web Link: http://www.gizmag.com/go/4990/.

Hanlon, Mike, Peugeot's exciting new 3-wheeler-the 20CUP, Gizmag, Aug. 28, 2005, 4 pages Web Link: http://www.gizmag.com/go/4494/.

Unknown Author, web page Polaris Slingshot company web page, Jun. 27, 2015, one page Web Link: http://www.polaris.com/en-us/slingshot.

Ian Stent, CKC Jun. 2012 Issue 63, pp. 17-19 Web Link: http://www.grinnallcars.com/grin-factor.pdf.

Unknown Author, web page, The Petrol Stop, Jun. 27, 2015, 1 page Web Link: http://www.thepetrolstop.com/2012/03/stimson-scorcher.html.

\* cited by examiner

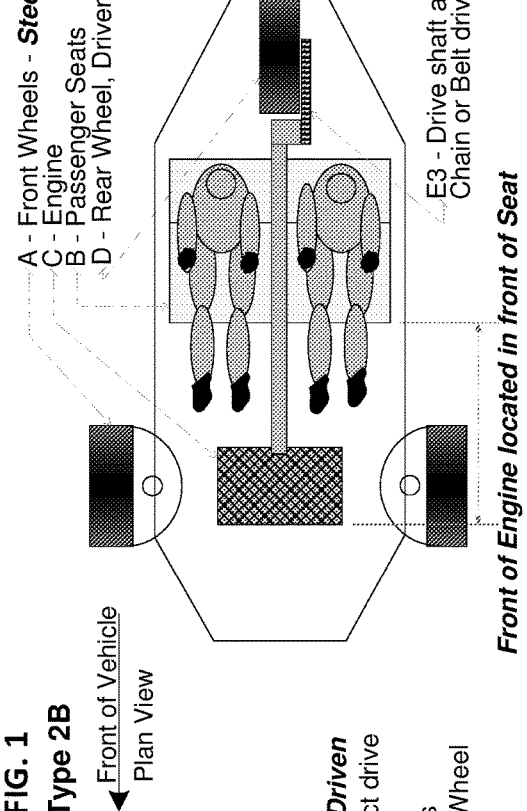
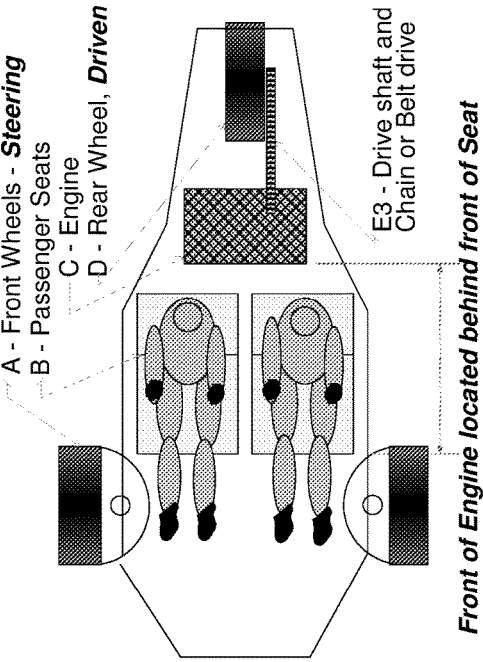
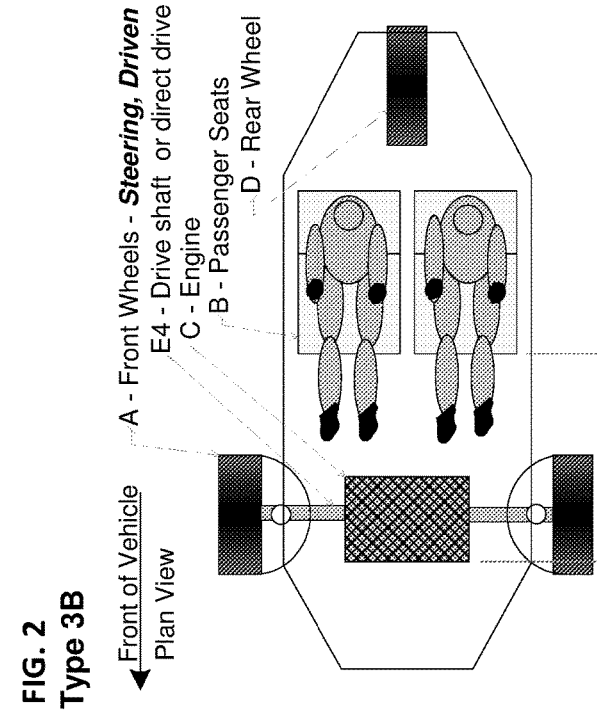
Drawing 1
Common existing 3 Wheeled Vehicle Types with two front wheels
*(Depictions of prior art)*
FIG. 1 Type 2B
FIG. 2 Type 3B
FIG. 3 Type 2C Side View Plan View Front of Vehicle →

Perspective View

Drawing 2

*Embodiment:*
*-Dual passenger, side by side seating*
*-Single Engine*

D - Rear Wheel
C - Engine
B - Passenger Seats
A - Front Wheels - Driven, Steering

A - Front Wheels - Driven, Steering
B - Passenger Seats
C - Engine
D - Rear Wheel

*Front of Engine located behind front of Seat*

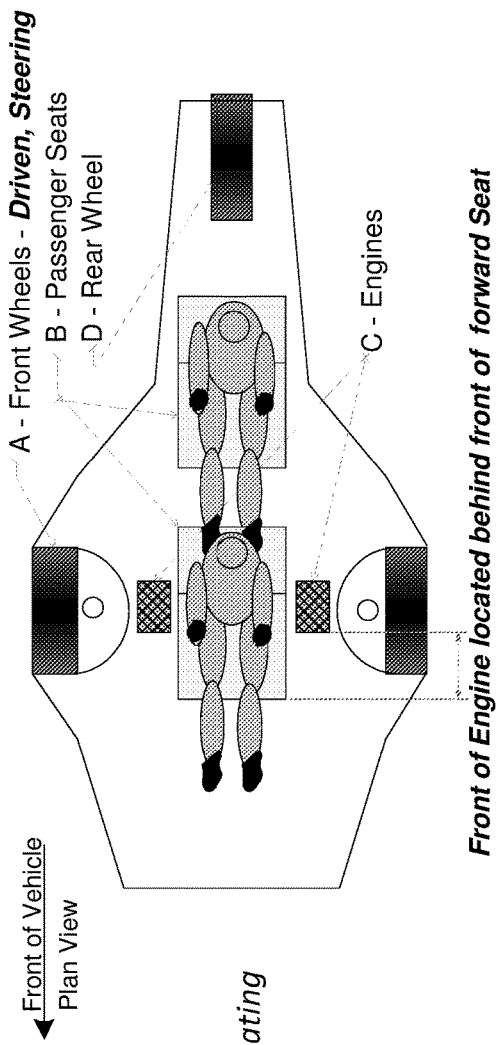
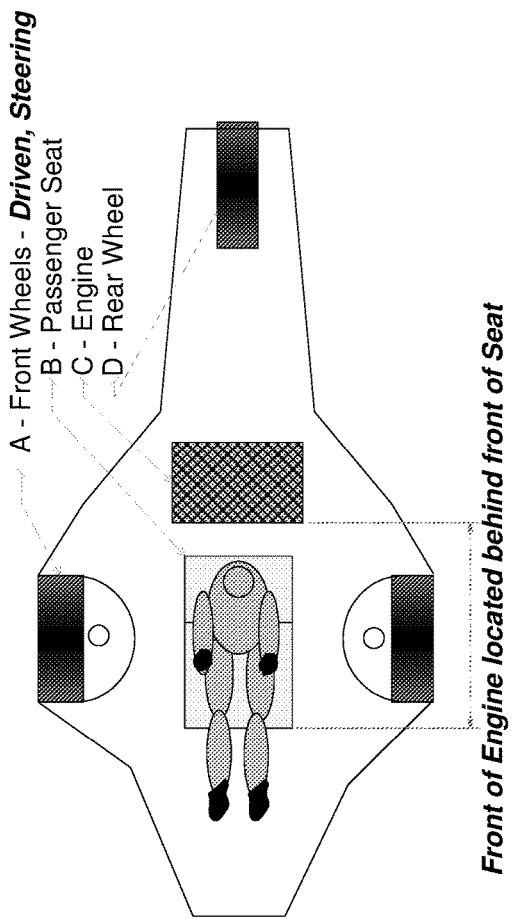
Drawing 3
FIG. 5
Embodiment:
- Dual passenger, serial seating
- Dual engine
FIG. 6
Embodiment:
- Single passenger seating
- Single engine Drawing 4

*Embodiment-Drive:*
*-Central Driveshaft*
*-Single Engine*

*Embodiment-Drive:*
*-Parallel Driveshaft*
*with Right Angle gears*
*-Single Engine*

Drawing 5

*Embodiment-Drive:*
*-Parallel Driveshaft*
*with Chain or Belt drive*
*-Single Engine*

*Embodiment-Drive:*
*-Driveshaft or Direct drive*
*-Dual Engines*

REAR ENGINE, FRONT WHEEL DRIVE THREE WHEELED VEHICLE

BACKGROUND

Field of the Invention

The present invention pertains to motor vehicles. More specifically, the present invention pertains to those having only three wheels.

Description of the Related Art

Typical road use, highway speed, three wheeled vehicles consist of the following layout types:

Type-1—Two wheels in the rear of the vehicle with the rear wheel driven.

Type 2—Two wheels in the front of the vehicle with the rear wheel driven. Variations of this are:
  (A) Straddle type seating where the body or engine is straddled by the passenger, whether the engine is directly underneath, forward, or rearward of the driver.
  (B) Traditional seating with engine in front of the passenger seat.
  (C) Traditional seating with engine behind the passenger seat.

Type 3—Two wheels in the front of the vehicle with the front wheels driven. Variations of this are:
  (A) Straddle type seating where the body or engine is straddled by the passenger, whether the engine is directly underneath, forward, or rearward of the driver.
  (B) Traditional seating with the engine in front of the passenger seat.
  (C) Traditional seating with engine behind the front of passenger seat.
    (1) Rear wheel steering.
    (2) Front wheel steering. This vehicle type is the present invention.

Three wheeled vehicles with two rear wheels, Type (1), suffer from detrimental stability problems when turning, and even more serious stability issues when braking while turning. This is a critical need, as maximum stability is required in emergency situations. It is very common for vehicles of this type to 'tip over' during more extreme maneuvers.

Three wheeled vehicles with a single rear wheel which is also the driven wheel, Type (2), have traction problems due to the power being driven through a single wheel. Loss of traction causes the driver to quickly lose control of the vehicle since there is no directional control. This can be especially dangerous when the vehicle is in a turn and the rear wheel loses traction. The loss of traction is compounded by the combination of lateral forces on the rear wheel from the turn, the forward forces from acceleration, and changes in contact pressure due to uneven road surfaces.

Three wheeled vehicles with two front driven wheels and the engine forward of the passenger seat, Type (3B), suffer from a broad variation in center of gravity as a result of varied passenger loading. The seated position requires legroom for the passenger, and pushes the engine farther away from the center of gravity of the driver. Not only does this impact vehicle dynamics while in motion, but it also brings about the larger concern of varying passenger loads based on the size of person(s), (especially if there are two seats), which changes the front to rear center of gravity for the vehicle as a whole. The inconsistent passenger load causes large variations of weight on the single rear wheel which dramatically changes the vehicle's dynamics, resulting in an inconsistent driving experience. This is of most concern during hard cornering, or situations involving wet or loose gravel roads where the traction of the rear wheel is reduced causing the vehicle to react differently due to the change in loading. Even the most experienced drivers may be challenged by the radical change in vehicle dynamics Vehicles with straddle type seating, Type (2A) and (3B) provide certain advantages, however they do not provide the comfort and safety of traditional seating.

Each of the layout types defined above could incorporate front wheel or rear wheel steering as further layout sub-types, as depicted under Type (3C). Vehicles with primary steering provided through the rear wheels are generally less stable at higher speeds, causing additional stability concerns with a three wheeled vehicle.

SUMMARY OF THE INVENTION

In contrast to the layouts described above, the present invention defines a layout which is a unique variation of Type (3), with the engine(s) placed behind passenger seat(s) while still driving the front wheels. The wheels are arranged with two in the front of the vehicle and one in the rear. The front wheels are the driven wheels as well as the primary steering wheels. One or more passenger seats can be located forward of the engine or engines.

It is an object of the present invention to provide a three-wheeled vehicle having a layout where weighting and wheel loading provides a stable platform for road use at highway speeds. The present invention provides the following advantages over previous layouts:

Since the passenger and the engine are significant weight considerations, locating these close to each other provides the optimal weighting for a three wheeled vehicle.

Variation of weight due to passenger loading is less of an impact to weight distribution and vehicle dynamics Variability of weight due to passenger loading being closer to front wheels.

Since two wheels are driven, vehicle can provide faster acceleration without loss of traction.

The rear wheel must support braking and lateral loads only, making it less likely to lose traction.

If the front wheels lose partial traction, vehicle will still retain a magnitude of control.

DESCRIPTION OF THE SEVERAL VIEWS OF THE DRAWING

Examples of common existing three wheeled vehicle Types:
Drawing (1):
FIG. 1—Type 2B—Plan View
FIG. 2—Type 3B—Plan View
FIG. 3—Type 2C—Plan View
Present Invention:
Drawing (2):

Embodiment: Dual Passenger, Side by Seating, Single Engine

Figure 4A:
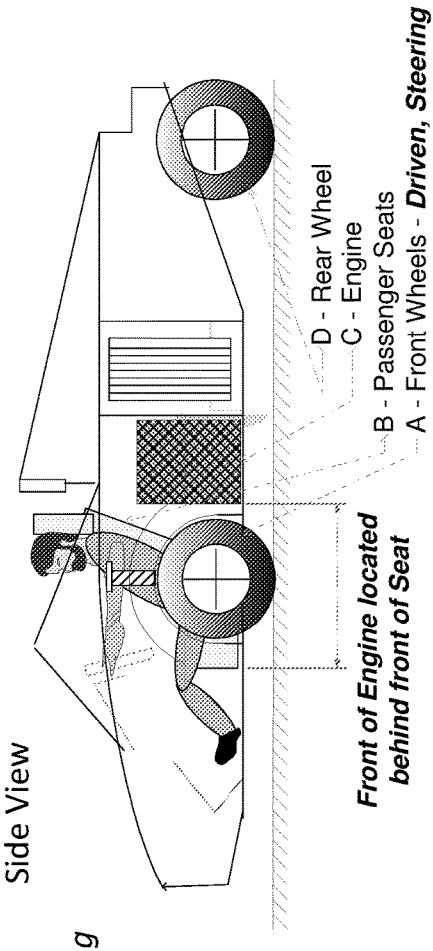
Figure 4B:
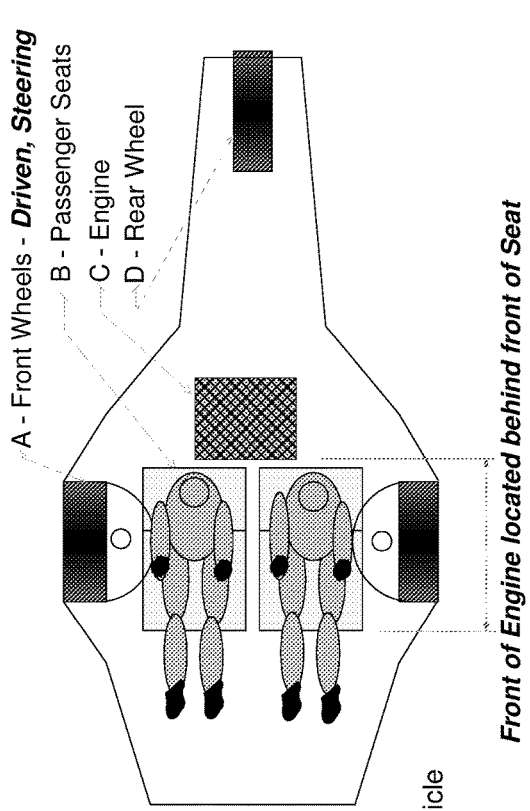
Figure 4C:
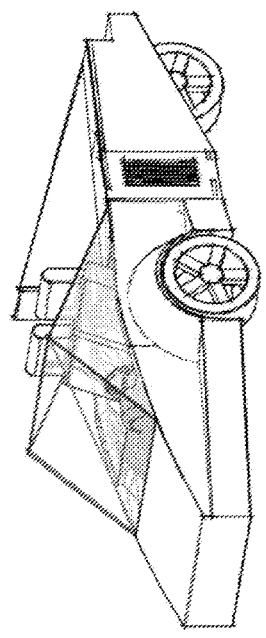

FIG. 4A—Embodiment—Side View
FIG. 4B—Embodiment—Plan View
FIG. 4C—Embodiment—Perspective View
Drawing (3):

Other Example Embodiments

FIG. 5—Plan View—dual passenger, serial seating, dual engine

FIG. 6—Plan View—single passenger seating, single engine

Example Drivetrain Embodiments

Figure 7:
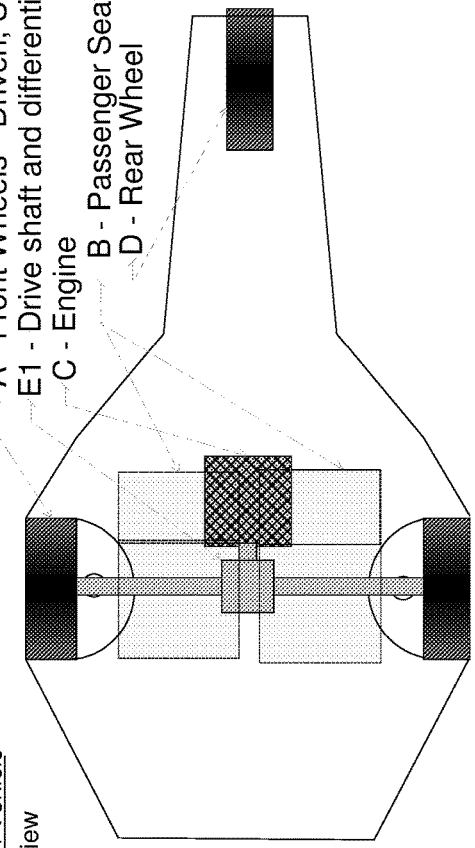
Figure 8:
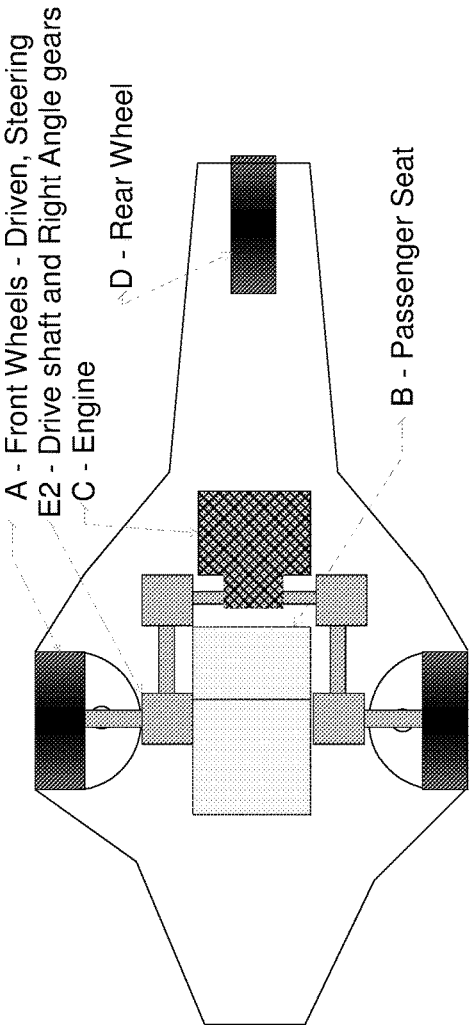
Figure 9:
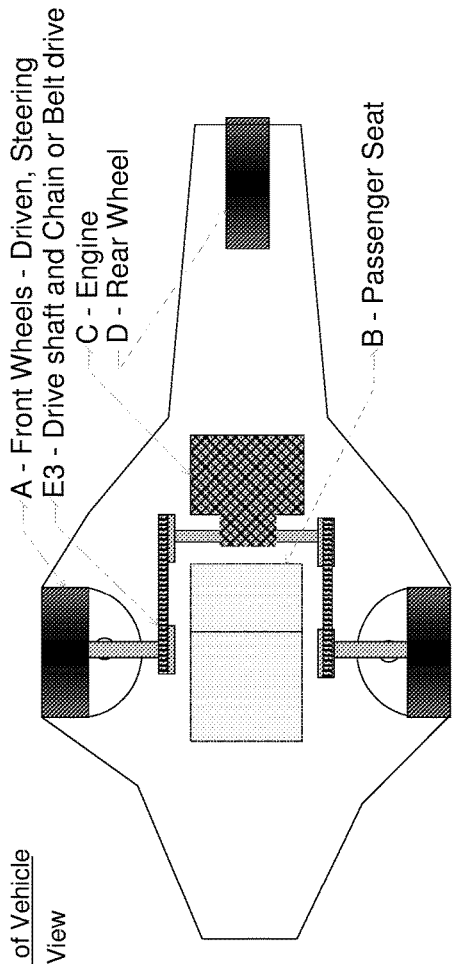

Drawing (4):
FIG. 7—Plan View—central drive shaft, single engine
FIG. 8—Plan View—parallel driveshaft with right angle gears, single engine
Drawing (5):
FIG. 9—Plan View—parallel driveshaft with chain or belt drive, single engine
FIG. 10—Plan View—drive shaft or direct drive, dual engines
For Embodiments, Items as follows:

All Embodiments (A) Front Wheels—Driven, Steering
(B) Passenger Seat(s)
(C) Engine
(D) Rear Wheel Drive Embodiments (E1) Drive shaft and differential
(E2) Drive shaft and Right Angle gears
(E3) Drive shaft and Chain or Belt drive
(E4) Drive shaft or Direct drive Before any embodiments of the invention are explained in detail, it is to be understood that the invention is not limited in its application to the details of construction and the detailed arrangement of components set forth in the following description or illustrated in the following drawings. The invention is capable of other embodiments not listed herein, and of being practiced or of being carried out in various ways. Also, it is to be understood that the phraseology and terminology used herein is for the purpose of description and should not be regarded as limiting.

DETAILED DESCRIPTION OF THE INVENTION

FIGS. 1, 2, 3 respectively portray general layouts of existing vehicle Types 2B, 2C, and 3B. These are the most common versions of existing three wheeled vehicles having two wheels in the front. There are numerous existing embodiments of these vehicle types with various seating arrangements, engine types, body types, structural arrangements, and component arrangements. Each of these figures portrays front wheels (item A), a rear wheel (item D) which is located behind the front wheels (item A), one or more engines (item C) with the location depicted in relationship to the front of the passenger seats (item B). Example embodiments of the connections from the engine to the driven wheels are shown as Drive shaft and Chain or Belt drive (item E3), as well as Drive shaft or direct drive (item E4).

As with the numerous embodiments of existing three wheeled vehicles, the present invention also has numerous possible embodiments. FIGS. 4A, 4B, 4C, 5, 6 depict example embodiments of the present invention.

The first example embodiment of the present invention is shown in FIG. 4A, showing dual passenger side by side seating and a single engine. The embodiment portrays front wheels (item A) which provide primary steering for the vehicle. A rear wheel (item D) is located behind the front wheels (item A). The front of the engine (item C) is located behind the front of the passenger seats (item B). The engine (item C) drives the front wheels (item A). The same embodiment is shown from a plan view in FIG. 4B, and from perspective view in FIG. 4C.

Another example embodiment is shown on FIG. 5 showing dual passenger serial seating and dual engines. The embodiment portrays front wheels (item A) which provide primary steering for the vehicle. A rear wheel (item D) is located behind the front wheels (item A). The front of the forward most engine (item C) is located behind the front of the forward most passenger seat (item B). The engine (item C) drives the front wheels (item A).

Another example embodiment is shown on FIG. 6 showing single passenger seating with a single engine. The embodiment portrays front wheels (item A) which provide primary steering for the vehicle. A rear wheel (item D) is located behind the front wheels (item A). The front of the forward most engine (item C) is located behind the front of the forward most passenger seat (item B). The engine (item C) drives the front wheels (item A).

Figure 10:
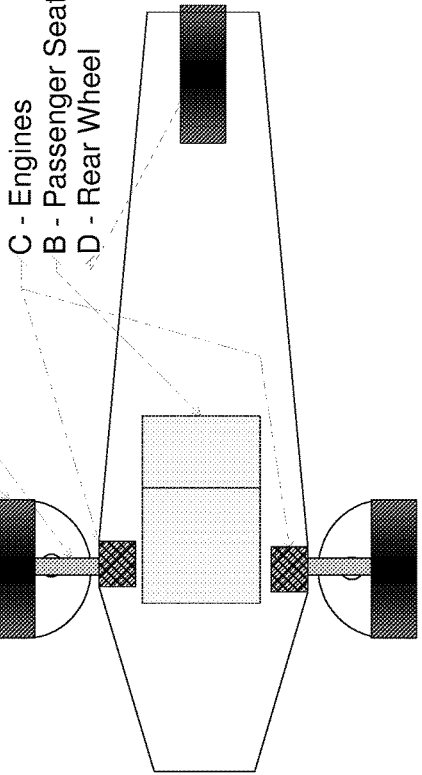

The present invention may utilize a variety of engine to driven wheel connection types and is not limited by possible types. Example connection types may include chain, belt, hydraulic, shaft, or direct. Example engine to driven wheel embodiments (FIGS. 7, 8, 9, 10) are provided to represent some of the many possibilities and show that the present invention is not limited by drive train mechanisms:

Central driveshaft (E1), single engine embodiment (FIG. 7).
Parallel driveshaft with right angle gears (E2), single engine embodiment (FIG. 8).
Parallel driveshaft with chain or belt drive (E3), single engine embodiment (FIG. 9).
Driveshaft or Direct drive (E4), dual engines (FIG. 10).

The present invention is not limited by engine type or number of engines. Gasoline, Hydrogen, Steam, Electric and other engine type embodiments are not limiting factors of the present invention.

If seating has adjustable seating, references to 'front of seat' indicate the forward most position of the seat. If multiple seats are used, the 'front of seat' refers to the seat in the forward most position in the vehicle.

References to 'front of engine' refer to the forward most portion of the engine in a vertical plane.

The present invention may have numerous embodiments for actual steering of the front wheels. The present invention is limited to vehicles with primary steering through the use of the front wheels. Advanced embodiments may include some incremental steering through the use of the rear wheel such a flexing, incremental movement or rotating for use in parking or slow speed maneuvering. Vehicle with primary steering accomplished through the rear wheel at highway speeds are not within the scope of the present invention.

The present invention is limited to standard sit-in or sit-on type seats (Item B), which is also referred to as 'traditional' seating. The present invention does not extend to vehicles with straddle seating, in which the passenger has one leg or foot on either side of the engine or primary body of the vehicle, regardless of whether the passenger is in a forward leaning, vertical, rearward leaning, reclined, or horizontal position. Straddle type seating may have the engine directly underneath, forward, or rearward of the driver.

In addition to items noted above, the present invention is not limited by:
frame or body structure type or material.
distances between items.
classification of vehicle such as motorcycle or car.

construction details
suspension types and variations.
body types.
other vehicle components.

While this invention has been described with several embodiments, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains

CITATIONS

Patent Citations

| Cited Patent | Filing date | Publi date | Applicant | Title | Comments related to present invention |
|---|---|---|---|---|---|
| U.S. Pat. No. 1,989,995 | 26 Feb. 1930 | 5 Feb. 1935 | Martin James V | Autoette | Rear Wheel Drive |
| U.S. Pat. No. 2,038,843 | | Apr. 28, 1936 | Jones Joseph R | Three wheeled automobile | Rear Wheel Steering |
| U.S. Pat No. 2,434,759 | 31 Aug. 1945 | 20 Jan. 1948 | Karl Donovan | Tricycle vehicle | Rear Wheel Drive |
| U.S. Pat. No. 2,740,486 | | Jul. 25, 1939 | Sto Paul Anna Charles Francois | Three wheel vehicle with one driving wheel and two steering wheels | Rear Wheel Drive |
| U.S. Pat No. 2,851,302 | 18 Jan. 1957 | 9 Sep. 1958 | Gen Motors Corp | Vehicle frame and underbody construction | Two Rear Wheels |
| U.S. Pat. No. 3,610,358 | 23 Jul. 1969 | 5 Oct. 1971 | Walter H Korff | Cycle car | Rear Wheel Drive |
| U.S. Pat. No. 3,826,326 | 9 Nov. 1971 | 30 Jul. 1974 | Blair D | Three wheeled automotive vehicular construction | Rear Wheel Drive |
| U.S. Pat. No. 4,020,914 | 23 Feb. 1976 | 3 May 1977 | Wolfgang Trautwein | Stabilized three-wheeled vehicle | Rear Wheel Drive |
| U.S. Pat. No. 4,353,567 | 24 Nov. 1980 | 12 Oct. 1982 | Weldy Ross A | Steering and suspension system for the front wheel of a three-wheeled vehicle | Single Front Wheel |
| U.S. Pat. No. 4,373,600 | 18 Jul. 1980 | 15 Feb. 1983 | Veda, Inc. | Three wheel drive vehicle | Rear Wheel Steering |
| U.S. Pat. No. 4,377,215 | 20 Aug. 1981 | 22 Mar. 1983 | Hare Terence G | Suspension system for automotive vehicles | Rear Wheel Drive |
| U.S. Pat. No. 4,448,278 | 16 Feb. 1982 | 15 May 1984 | Badsey William John | Land vehicle | Rear Wheel Drive |
| U.S. Pat. No. 4,453,763 | 13 Apr. 1982 | 12 Jun. 1984 | Trihawk, Inc. | Frame and body construction for automotive passenger vehicle | Front Engine |
| U.S. Pat. No. 4,573,546 | 30 Apr. 1984 | 4 Mar. 1986 | Honda Giken Kogyo Kabushiki Kaisha | Three-wheeled motor vehicle | Front Engine |
| U.S. Pat. No. 4,625,825 | 31 Jan. 1986 | 2 Dec. 1986 | Ethier Pierre M | Front-drive three-wheels vehicle with tandem drive and passenger | Front Engine |
| U.S. Pat. No. 4,662,468 | 24 Jan. 1986 | 5 May 1987 | Ethier Pierre M | Snowmobile-motorcycle three-wheel vehicle | Front Engine |
| U.S. Pat. No. 4,697,663 | | Oct. 6, 1987 | Wolfgang Trautwein | Three-wheeled vehicle | Rear Wheel Drive |
| U.S. Pat. No. 4,703,824 | 16 May 1984 | 3 Nov. 1987 | Honda Giken Kogyo Kabushiki Kaisha | Three-wheeled vehicle | 3 Wheel Steering |
| U.S. Pat. No. 4,787,470 | 30 Jun. 1986 | 29 Nov. 1988 | Yamaha Hatsudoki Kabushiki Kaisha | Three wheel vehicle | Rear Wheel Drive |
| U.S. Pat. No. 4,919,225 | 31 Mar. 1988 | 24 Apr. 1990 | Sturges Daniel D | Platform oriented transportation vehicle | Front Engine |
| U.S. Pat. No. 5,116,069 | 11 Mar. 1991 | 26 May 1992 | Miller Robert H | Three-wheel vehicle | Two Rear Wheels |
| U.S. Pat. No. 5,236,060 | | Aug. 17, 1993 | William D. Huber | Three-wheel vehicle and conversion kit | Rear Wheel Drive, Straddle Seating |
| U.S. Pat. No. 5,248,011 | 23 Jan. 1992 | 28 Sep. 1993 | Richards Donald C | Three wheeled vehicle having driven front wheels and steerable rear wheel | Rear Wheel Steering |
| U.S. Pat. No. 5,431,243 | 17 Aug. 1993 | 11 Jul. 1995 | Richards; Donald C. | Three wheeled vehicle with all wheel steering | Three Wheel Steering |
| U.S. Pat. No. 5,433,285 | 27 Sep. 1993 | 18 Jul. 1995 | Richards; Donald C. | Three wheeled vehicle | Two Rear Wheels |
| U.S. Pat. No. 5,495,905 | 21 Sep. 1994 | 5 Mar. 1996 | Fini, Jr.; Anthony W. | Modular motor vehicle | Four Wheels |
| U.S, Pat. No. 5,806,622 | 24 Apr. 1996 | 15 Sep. 1998 | Nev Corporation | Lightweight vehicle with pivotal canopy | Rear Wheel Drive |
| U.S. Pat. No. 5,927,424 | 13 Jun. 1995 | 27 Jul. 1999 | Brinks Westmaas B.V. | Self-stabilizing, directionally controllable vehicle with at least three wheels | Two Rear Wheels, tilting Mechanism |

-continued

| Cited Patent | Filing date | Publi date | Applicant | Title | Comments related to present invention |
|---|---|---|---|---|---|
| U.S. Pat. No. 6,641,154 | 9 Sep. 1999 | 4 Nov. 2003 | Jeffrey Vey | Air bladder suspension for three-wheeled vehicle | Two Rear Wheels |
| U.S. Pat. No. 7,090,234 | 22 Sep. 2003 | 15 Aug. 2006 | Honda Giken Kogyo Kabushiki Kaisha | Three-wheel vehicle with swinging mechanism | Two Rear Wheels |
| U.S. Pat. No. 7,185,900 | 22 Aug. 2003 | 6 Mar. 2007 | Cleveland T-Trike Manufacturing, Inc. | Frame and steering mechanism for three-wheel vehicle | Two Rear Wheels |
| U.S. Pat. No. 7,445,070 | 4 May 2006 | 4 Nov. 2008 | Pickering Gregory L | Three wheel motorcycle | Two Rear Wheels |
| U.S. Pat. No. 7,464,781 | 18 Oct. 2002 | 16 Dec. 2008 | Bombardier Recreational Product Inc. | Three-wheeled vehicle having a split radiator and an interior storage compartment | Rear Wheel Drive |
| U.S. Pat. No. 7,543,672 | 1 May 2006 | 9 Jun. 2009 | Bombardier Recreational Products Inc. | Straddle-type wheeled vehicle and frame thereof | Rear Wheel Drive |
| U.S. Pat. No. 7,549,494 | 27 Mar. 2006 | 23 Jun. 2009 | Zichek Daniel A | Transverse mounted mid-engine three wheel vehicle | Two Rear Wheels |
| U.S. Pat. No. 7,588,110 | 1 Sep. 2005 | 15 Sep. 2009 | Marc Gregory Martino | Three-wheeled vehicle with centrally positioned motor and driver's seat | Front Engine |
| US 20130056287 | (application) | 7 Mar. 2013 | Young Jin Park, Youn-sik Park, Jae Seok YOU | Three-wheeled electric vehicle | Rear wheel steering |
| U.S. Pat. No. 8,544,587 | | 1 Oct. 2013 | James A.J. Holroyd, Gustavo A. Aramayo, Brian T. Utter, Jason J. Hohenstein, Vittorio Tomolillo, | Three wheeled vehicle | Rear Wheel Drive |
| U.S. Pat. No. 8,646,794 | | 11 Feb. 2014 | Craig Mullin | Three-wheeled motorized vehicle | Front Engine, Straddle Seat |
| U.S. Pat. No. 8,662,228 | | Mar. 4, 2014 | Robert B. Hill, Fred Lux, Timothy Michael Miller, Edmund Jerome Stilwell | Free-to-lean three-wheeled passenger vehicle, power plant controller and body therefor | Rear Wheel Drive |
| U.S. Pat. No. 8,695,746 | | Apr. 15, 2014 | James A. J. Holroyd, Gustavo A. Aramayo, Jason J. Hohenstein, Mathew Bradley Wiest, Jeffrey D. Bennett, Mark Alan Ziliak | Three wheeled vehicle | Front Engine, Rear Wheel Drive |
| U.S. Pat. No. 8,781,684 | | Jul. 15, 2014 | Ian A. Bruce | Steering and control systems for a three-wheeled vehicle | Two Rear Wheels |
| U.S. Pat. No. 8,840,131 | | Sep. 23, 2014 | David Calley | Three-wheeled vehicle | Rear wheel steering |
| USD584188 | 19 Jun. 2006 | 6 Jan. 2009 | Volkswagen Ag | Vehicle | Rear Wheel Drive |

Non-Patent Citations

Non Patent Citation #1
Unknown Author, Wikipedia: Three Wheeled Vehicles with Two Front Wheels Web site link; http://en.wikipedia.org/wiki/Three-wheeler#Examples Date: Jun. 21, 2015

| Two front wheels | | | |
|---|---|---|---|
| Name | Country | Years manufactured | Comments Relative to Present Disclosure |
| Léon BolléeVoiturette | France | 1895-? | Rear wheel drive |
| Advance 6 hp air-cooled Tri Car and 9 hp water-cooled Tri Car[7] | England | 1902-12 | Rear wheel drive |
| Egg | Switzerland | 1896-1899 | Rear wheel drive |
| HumberTricar[8][9] | England | 1904 | Rear wheel drive |
| Riley Olympia Tricar[10] | England | 1904 | Rear wheel drive |
| Lagonda Tricar[12] | England | 1904-07 | Rear wheel drive |
| Anglian | England | 1905-07 | Rear wheel drive |
| Armadale | England | 1906-07 | Rear wheel drive |
| Morgan V-Twin and F-Series | England | 1911-39, 1932-52 | Front Engine |
| American Tri-Car | United States | 1912 | Rear Wheel Drive |

-continued

| Name | Country | Years manufactured | Comments Relative to Present Disclosure |
|---|---|---|---|
| Two front wheels | | | |
| Birmingham Small Arms Company Three Wheeler | England | 1929-36 | Front Engine |
| Zaschka | Germany | 1929 | Rear Wheel drive |
| Dymaxion car | United States | 1933 | Rear wheel steering |
| Mathis VEL 333 | France | 1946 | Front engine |
| Velorex Oskar and other models | Czechoslovakia | 1951-71 | Rear wheel drive |
| Isetta | UK | 1957-62 | Rear wheel drive |
| Scootacar | UK | 1957-64 | Rear wheel drive |
| Messerschmitt KR175 | Germany | 1953-64 | Rear wheel drive |
| Messerschmitt KR200 | Germany | 1953-64 | Rear wheel drive |
| Peel P50 | Isle of Man | 1963-64 | Rear wheel drive |
| HM Vehicles Free-way | United States | 1979-82 | Rear wheel drive |
| Campagna T-Rex | Canada | 1996-present | Rear wheel drive |
| Malone Car Company F1000\|Skunk SS\|TAZR | United Kingdom | 1999-present | Front Engine |
| Cree SAM | Switzerland | 2001 | Rear wheel drive |
| Scoot Coupe | United States | 2004-present | Rear wheel drive |
| Myers Motors NmG ("No more Gas") | United States | 2006-present | Rear wheel drive |
| Can-Am Spyder Roadster | Canada | 2007-present | Rear wheel drive |
| Brudeli 645L | Norway | 2008- | Rear wheel drive |
| Moonbeam | United States | 2008-present | Rear wheel drive |
| Triac | United States | 2009-2011 | Front Engine |
| XR-3 Hybrid | United States | Plans-2008, Kit-2009 | Two engines: Front Engine (gas), Front Wheel drive; and Rear engine (electric), rear wheel drive. |
| Aptera 2e | United States | | Electric Front Engine |
| Triton Trikes | United States | 2000-current | Front Engine |
| Elio Motors | Shreveport, LA, United States | Begins 1H 2016[16] | Front Engine |
| Go3Wheeler | United States | 2014 | Rear Wheel Drive |

Non Patent Reference #2
Author: Elvis Payne, Three Wheelers.Com-query: Manufactures with 2 Wheels in Front
Web site link; http://www.3wheelers.com/; Database Query: Wheel Configuration='2F1R' or 'Both'
Date: Jun. 21, 2015

| Info | Manufacturer | From | To | Country | Comments related to present disclosure |
|---|---|---|---|---|---|
| | | | | Query Results: | |
| | Copeland | 1884 | 1891 | United States | Rear Wheel Steering |
| | Butler | 1890 | 1890 | United Kingdom | Rear Wheel Drive |
| | Lambert | 1891 | 1917 | United States | Rear Wheel Drive |
| | Bernardi | 1894 | 1901 | Italy | Rear Wheel Drive |
| | Leyland | 1895 | 1895 | United Kingdom | Rear Wheel Drive |
| | Leon Bollee | 1895 | 1899 | France | Rear Wheel Drive |
| | Wolseley | 1896 | 1899 | United Kingdom | Rear Wheel Drive |
| | Humber | 1896 | 1910 | United Kingdom | Rear Wheel Drive |
| | Riker | 1896 | 1900 | United States | Rear Wheel Drive |
| | Eagle | 1899 | 1908 | United Kingdom | Rear Wheel Drive |
| | Jackson | 1899 | 1914 | United Kingdom | Front Engine |
| | Beeston | 1899 | 1905 | United Kingdom | Rear Wheel Drive |
| | Jackson & Kinnings | 1900 | 1908 | United Kingdom | Rear Wheel Drive |
| | Singer | 1900 | 1907 | United Kingdom | Rear Wheel Drive |
| | Lion | 1900 | 1905 | United Kingdom | Rear Wheel Drive |
| | Ribble Motors | 1900 | 1908 | United Kingdom | Rear Wheel Drive |
| | Riley | 1900 | 1907 | United Kingdom | Rear Wheel Drive |
| | Lagonda | 1901 | 1905 | United Kingdom | Rear Wheel Drive |
| | Sautel Et Sechaud | 1902 | 1904 | France | Rear Wheel Drive |
| | Quadrant | 1903 | 1906 | United Kingdom | Rear Wheel Drive |
| | Wolf | 1903 | 1906 | United Kingdom | Rear Wheel Drive |
| | Raleigh | 1903 | 1935 | United Kingdom | Rear Wheel Drive |
| | Garrard | 1904 | 1904 | United Kingdom | Rear Wheel Drive |
| | Repton | 1904 | 1904 | United Kingdom | Rear Wheel Drive |
| | NSU | 1905 | 1910 | Germany | Rear Wheel Drive |
| | Lurquin-Coudert | 1905 | 1914 | France | Rear Wheel Drive |
| | Kerry | 1905 | 1907 | United Kingdom | Rear Wheel Drive |

-continued

| Query Results: | | | | |
|---|---|---|---|---|
| Info Manufacturer | From | To | Country | Comments related to present disclosure |
| Rexette | 1905 | 1905 | United Kingdom | Rear Wheel Drive |
| Sanchis | 1906 | 1912 | France | Rear Wheel Drive |
| Contral | 1906 | 1908 | France | Rear Wheel Drive |
| Advance | 1906 | 1908 | United Kingdom | Rear Wheel Drive |
| Certain | 1907 | 1907 | France | Rear Wheel Drive |
| PMC (1) | 1910 | 1910 | United Kingdom | Rear Wheel Drive |
| Kelsey | 1910 | 1912 | United Kingdom | Rear Wheel Drive |
| Morgan | 1910 | 1951 | United Kingdom | Front Engine |
| Motorette (2) Kelsey | 1910 | 1912 | United States | Rear Wheel Drive |
| Crouch | 1912 | 1912 | United Kingdom | Rear Wheel Drive |
| Girling | 1912 | 1912 | United Kingdom | Rear Wheel Drive |
| Autotrix | 1913 | 1913 | United Kingdom | Front Engine |
| Torpelle | 1914 | 1914 | France | Rear Wheel Drive |
| Thurlow | 1914 | 1921 | United Kingdom | Front Engine |
| Leyat | 1914 | 1914 | France | No Driven Wheels |
| LSD | 1919 | 1924 | United Kingdom | Front Engine |
| Trident | 1919 | 1920 | France | Single Front Wheel |
| MB (Merrall-Brown) | 1919 | 1921 | United Kingdom | Rear Wheel Drive |
| Castle Three | 1919 | 1922 | United Kingdom | Front Engine |
| Wooler | 1920 | 1926 | United Kingdom | Front Engine |
| Eibach | 1921 | 1925 | Germany | Rear Wheel Drive |
| Diable | 1921 | 1924 | France | Rear Wheel Drive |
| Atomette | 1921 | 1922 | United Kingdom | Rear Wheel Drive |
| Monet-Goyon | 1921 | 1926 | France | Front Engine |
| Xtra | 1922 | 1924 | United Kingdom | Rear Wheel Drive |
| Thompson Bros | 1922 | 1922 | United Kingdom | Rear Wheel Drive |
| Diablo | 1922 | 1927 | Germany | Front Engine |
| Sandford | 1922 | 1936 | France | Front Engine |
| D'Yrsan | 1923 | 1928 | France | Front Engine |
| Omega (1) | 1925 | 1927 | United Kingdom | Front Engine |
| Mops | 1925 | 1925 | Germany | Rear Wheel Drive |
| Coventry-Victor | 1926 | 1938 | United Kingdom | Rear Wheel Drive |
| BSA | 1929 | 1936 | United Kingdom | Front Engine |
| Zaschka | 1929 | 1929 | Germany | Rear Wheel Drive |
| Framo-Werke | 1932 | 1937 | Germany | Front Engine |
| Hercules | 1932 | 1933 | Germany | Rear Wheel Drive |
| JMB | 1933 | 1935 | United Kingdom | Rear Wheel Drive |
| Dymaxion | 1933 | 1934 | United States | Rear Wheel Steering |
| Rollfix | 1933 | 1936 | Germany | Rear Wheel Drive |
| Kaiser | 1935 | 1935 | Germany | Rear Wheel Drive |
| Airomobile | 1937 | 1938 | United States | Front Engine |
| Gillet | 1937 | 1937 | Belgium | Rear Wheel Drive |
| Tatra | 1938 | 1938 | Czech Republic | Rear Wheel Drive |
| Arzens | 1942 | 1942 | France | Rear Wheel Drive |
| Bubblepuppy | 1944 | 1947 | United States | Front Engine |
| Bouffort | 1945 | 1960 | France | Front Engine |
| Mathis | 1945 | 1948 | Germany | Front Engine |
| Dot | 1947 | 1956 | United Kingdom | Rear Wheel Drive |
| Fend | 1948 | 1953 | Germany | Rear Wheel Drive |
| Altona | 1948 | 1948 | Belgium | Front Engine |
| Kurier | 1948 | 1948 | Czech Republic | Front Engine |
| Vallée | 1949 | 1954 | France | Rear Wheel Drive |
| Krejbich | 1949 | 1949 | Czech Republic | Rear Wheel Drive |
| Nitta Sangyo | 1950 | 1950 | Japan | Rear Wheel Drive |
| Tripolino | 1950 | 1950 | Czech Republic | Rear Wheel Drive |
| Fuldamobil | 1950 | 1961 | Germany | Rear Wheel Drive |
| Vincent | 1950 | 1955 | United Kingdom | Rear Wheel Drive |
| Brutsch | 1951 | 1957 | Germany | Rear Wheel Drive |
| Bonnallack | 1951 | 1952 | United Kingdom | Rear Wheel Drive |
| Meyra | 1952 | 1956 | Germany | Rear Wheel Drive |
| EEC | 1952 | 1954 | United Kingdom | Rear Wheel Drive |
| Felber | 1952 | 1953 | Austria | Rear Wheel Drive |
| Libelle | 1952 | 1954 | Austria | Rear Wheel Drive |
| DS Malterre | 1952 | 1958 | France | Rear Wheel Drive |
| Nobel | 1952 | 1961 | United Kingdom | Rear Wheel Drive |
| Gaitán | 1953 | 1953 | Spain | (various models) Two Rear Wheels or Rear Wheel Drive |
| Issi | 1953 | 1953 | Italy | Rear Wheel Drive |
| Cimera | 1953 | 1957 | Spain | Rear Wheel Drive |
| Edith | 1953 | 1957 | Australia | Rear Wheel Drive |
| Messerschmitt | 1953 | 1962 | Germany | Rear Wheel Drive |

-continued

| Info | Manufacturer | From | To | Country | Comments related to present disclosure |
|---|---|---|---|---|---|
| | Boli | 1953 | 1957 | Spain | Rear Wheel Drive |
| | Inter | 1953 | 1956 | France | Rear Wheel Drive |
| | Isetta | 1954 | 1964 | Germany | Rear Wheel Drive |
| | Heinkel | 1954 | 1958 | Germany | Rear Wheel Drive |
| | Vimp | 1954 | 1954 | United Kingdom | Rear Wheel Drive |
| | BMW | 1954 | 1964 | Germany | Rear Wheel Drive |
| | Shelter | 1954 | 1954 | Netherlands | Rear Wheel Drive |
| | Kroboth | 1954 | 1955 | Germany | Rear Wheel Drive |
| | Goricke | 1954 | 1959 | Germany | Rear Wheel Drive |
| | Tri-Car | 1955 | 1955 | United States | Rear Wheel Drive |
| | MT | 1955 | 1962 | Spain | Two Rear Wheels |
| | Pinguin | 1956 | 1956 | Germany | Rear Wheel Drive |
| | Belcar | 1956 | 1956 | Switzerland | Rear Wheel Drive |
| | Bly | 1956 | 1957 | United Kingdom | Front Engine |
| | Powerdrive | 1956 | 1958 | United Kingdom | Rear Wheel Drive |
| | Unicar | 1956 | 1968 | United Kingdom | Rear Wheel Drive |
| | Coronet | 1957 | 1960 | United Kingdom | Rear Wheel Drive |
| | Henri Baldet | 1957 | 1957 | United Kingdom | Rear Wheel Drive |
| | Scootacar | 1957 | 1964 | United Kingdom | Rear Wheel Drive |
| | Fuji Motors Corp | 1957 | 1958 | Japan | Rear Wheel Drive |
| | Velorex | 1958 | 1971 | Czech Republic | Rear Wheel Drive |
| | Jones | 1958 | 1958 | United Kingdom | Rear Wheel Drive |
| | Berkeley | 1959 | 1960 | United Kingdom | Front Engine |
| | Frisky | 1959 | 1964 | United Kingdom | Rear Wheel Drive |
| | Hamblin | 1960 | 1960 | United Kingdom | Rear Wheel Drive |
| | Trojan | 1962 | 1965 | Germany | Rear Wheel Drive |
| | Trivan | 1962 | 1964 | United States | Rear Wheel Drive |
| | Zaika | 1962 | 1965 | Russian Federat | Rear Wheel Drive |
| | Ranger | 1964 | 1976 | United Kingdom | Front Engine |
| | Howecette | 1968 | 1968 | United Kingdom | Rear Wheel Drive |
| | AF Cars | 1969 | 1980 | United Kingdom | Front Engine |
| | Teihol | 1970 | 1983 | France | Rear Wheel Drive |
| | Citeadine | 1970 | 1983 | France | Rear Wheel Drive |
| | Mumford | 1971 | 1986 | United Kingdom | Rear Wheel Drive |
| | Fiberfab | 1971 | 1975 | United States | Rear Wheel Drive |
| | PMC (2) Powers Motor Corp | 1974 | 1974 | United States | Rear Wheel Drive or Front Engine depending on config |
| | Volkswagen-Scooter | 1974 | 1980 | United States | Front Engine |
| | Mosquito | 1974 | 1979 | United Kingdom | Front Engine |
| | Duo Delta | 1974 | 1974 | United States | Rear Wheel Drive |
| | Dale | 1975 | 1975 | United States | Rear Wheel Drive |
| | Stimson | 1976 | 1976 | United Kingdom | Straddle Seating |
| | Automirage | 1976 | 1985 | Italy | Rear Wheel Drive |
| | Turbo Phantom | 1978 | 1982 | United States | Rear Wheel Drive |
| | HM Vehicles | 1979 | 1983 | United States | Rear Wheel Drive |
| | Trihawk | 1982 | 1985 | United States | Front Engine |
| | Litestar | 1982 | 1988 | United States | Rear Wheel Drive |
| | Feora | 1982 | 1982 | United States | Rear Wheel Drive |
| | Triad | 1982 | 1985 | United Kingdom | Front Engine |
| | Gamma | 1982 | 1984 | United States | Rear Wheel Drive |
| | Unisport | 1982 | 1988 | United States | Rear Wheel Drive |
| | Zoe Motors | 1982 | 1983 | United States | Rear Wheel Drive |
| | Doran | 1983 | Present | United States | Front Engine |
| | D&A Vehicles | 1983 | 1986 | United States | Rear Wheel Drive |
| | Dolphin | 1983 | 1986 | United States | Rear Wheel Drive |
| | Ford | 1983 | 1983 | United States | Rear Wheel Drive |
| | Fire Aero | 1984 | 1988 | United States | Rear Wheel Drive |
| | Shrike | 1984 | 1984 | United States | Rear Wheel Drive |
| | Gamma | 1984 | 1988 | United States | Rear Wheel Drive |
| | DRK | 1984 | 1998 | United Kingdom | Front Engine |
| | Replicar | 1985 | 1987 | United Kingdom | Rear Wheel Drive |
| | Hudson | 1985 | 1998 | United Kingdom | Front Engine |
| | Buckland | 1985 | 1998 | United Kingdom | Front Engine |
| | Pembleton | 1986 | Present | United Kingdom | Front Engine |
| | Kudos | 1986 | 1986 | United Kingdom | Front Engine |
| | Trilux | 1986 | 1986 | United Kingdom | Front Engine |
| | Le Patron | 1986 | Present | Netherlands | Front Engine |
| | Horlacher | 1986 | 1990 | Switzerland | Rear Wheel Drive |
| | Saccomando | 1986 | 1992 | United Kingdom | Front Engine |
| | Robert Q Riley | 1986 | Present | United States | Rear Wheel Drive |
| | Falcon | 1986 | 1986 | United Kingdom | Front Engine |

-continued

Query Results:

| Info | Manufacturer | From | To | Country | Comments related to present disclosure |
|---|---|---|---|---|---|
| | Trigger Technics B.V | 1987 | Present | Netherlands | Rear Wheel Drive |
| | JZR | 1987 | Present | United Kingdom | Front Engine |
| | Badsey | 1987 | 1990 | United States | Rear Wheel Drive |
| | SportCycle | 1988 | Present | United States | Rear Wheel Drive |
| | Lomax | 1988 | Present | United Kingdom | Front Engine |
| | Tri-Tech Autocraft | 1990 | Present | United Kingdom | Rear Wheel Drive |
| | Trifid | 1990 | 1991 | United Kingdom | Front Engine |
| | BRA | 1992 | 2006 | United Kingdom | Front Engine |
| | JBF Boxer | 1992 | 1992 | United Kingdom | Front Engine |
| | Grinnall Specialist Cars | 1992 | Present | United Kingdom | Rear Wheel Drive |
| | Suntera | 1994 | 1997 | United States | Rear Wheel Drive |
| | Blackjack | 1995 | Present | United Kingdom | Front Engine |
| | Texas Rocket | 1995 | 1995 | United States | Rear Wheel Drive |
| | Corbin Motors | 1996 | 2003 | United States | Sparrow-Rear Wheel Drive Merlin-Front Engine |
| | Malone Car Company | 1997 | Present | United Kingdom | Front Engine |
| | Mercedes Benz | 1997 | 1997 | Germany | Rear Wheel Drive |
| | Carver | 1997 | 2009 | Netherlands | 2 Rear Wheels |
| | IndyCycle | 1999 | 1999 | United States | Rear Wheel Drive |
| | Landshark | 2000 | 2000 | United Kingdom | Rear Wheel Drive |
| | Cree | 2001 | 2001 | Switzerland | Rear Wheel Drive |
| | Sealion | 2002 | 2002 | Norway | Front Engine |
| | TR Hog | 2002 | 2002 | United States | Rear Wheel Drive |
| | SLOW | 2003 | 2003 | United Kingdom | Rear Wheel Steering |
| | QPod | 2004 | Present | United Kingdom | Rear Wheel Drive |
| | Myers Motors | 2004 | Present | United States | Rear Wheel Drive |
| | Peugeot | 2005 | 2005 | France | Front Engine |
| | Sceadu | 2006 | Present | United States | Rear Wheel Drive |
| | Fuel Vapor Technologies | 2006 | Present | Canada | Front Engine |
| | Xzilarakor | 2006 | Present | United States | Rear Wheel Drive |
| | Liberty Motors | 2007 | Present | United States | Front Engine |
| | Bonnington | 2007 | 2007 | Australia | Rear Wheel Drive |
| | Cirbin Motors Corp. | 2007 | Present | United States | Rear Wheel Drive |
| | Planet Engineering Ltd | 2007 | Present | United Kingdom | Front Engine |
| | Elio Motors | 2008 | Present | United Kingdom | Front Engine |
| | Razor | 2012 | Present | United Kingdom | Rear Wheel Drive |
| | KTM | 2013 | 2013 | Austria | Rear Wheel Drive |

Other Non Patent Citations

| # | Author, Desc, Date | Web Link | Vehicle | Comments related to present disclosure |
|---|---|---|---|---|
| 3 | Unknown Author, web page image of LaBolle vehicle, Jun. 27, 2015, one page | http://thegegeblog.canalblog.com/archives/2010/04/01/17439628.html | Bolle-La Bolle 1896 | Rear wheel drive |
| 4 | Unknown Author, web page Wikipedia Griffon vehicle, Jun. 27, 2015, one page | https://de.wikipedia.org/wiki/%C3%89tablissements_Griffon | Griffon-1906 | Rear wheel drive |
| 5 | Unknown Author, web page AC History, Jun. 27, 2015, two pages | http://www.uniquecarsandparts.com.autheritage_ac.php | AC-Auto Carrier 1903-UK | Rear wheel drive |
| | | | AC-Sociable 1907-UK | Rear wheel drive |
| 6 | Unknown Author, web page Searching for lost Indians, Jun. 27, 2015, two pages | https://touringroads.wordpress.com/2013/10/05/searching-for-lost-indians-an-archival-journey/ | Advance Motor Co-ForeCar/Tricar 1907-UK | Rear wheel drive |
| 7 | Elvis Payne, web page Asia, Jun. 27, 2015, One page | http://www.3wheelers.com/aisa.html | Actividades Industriales-Aisa 1952-Spain | Rear wheel drive |
| 8 | Elvis Payne, web page A.F.Cars, Jun. 27, 2015, One page | http://www.3wheelers.com/afcars.html | AF Cars-AB1 Spider/Grand Prix 1969 | Front Engine |

| # | Author, Desc, Date | Web Link | Vehicle | Comments related to present disclosure |
|---|---|---|---|---|
| 9 | Unknown Author, web page, Welcome to the home of Doug Malewicki's inventions, engineering projects and fun stuff. Jun. 27, 2015, two pages | http://www.canosoarus.com/ | Aero Visions Inc- California Commuter 1980-United States | Rear wheel drive |
| 10 | Unknown Author, web page Welcome to BRA Motorworks, Jun. 27, 2015, one page | http://www.bra-cars.com/ | BRA Motor Works- CX3, CV3, Leighton, MR3 2003-present-UK | Front Engine |
| 11 | Hanlon, Mike, the three-wheeled driving machine, Gizmag, Jan. 21, 2005, 4 pages | http://www.gizmag.com/go/3628/ | Mercedes-Benz F 300 Life-Jet Concept Car | Rear wheel drive |
| 12 | Unknown Author, web page Home=>Concept Cars, JUn. 27, 2015, one page | http://www.diseno-art.com/ encyclopedia/concept_cars/aprilia_ magnet.html | Aprilia Magnet Concept Only | Straddle Seating |
| 13 | Hanlon, Mike, VW's 3-wheel sportcar, Gizmag, Jan. 5, 2006, 4 pages | http://www.gizmag.com/go/4990/ | Volkswagen 3 wheeler GX3 Concept Car | Rear wheel drive |
| 14 | Hanlon, Mike, Peugeot's exciting new 3-wheeler-the 20CUP, Gizmag, Aug. 28, 2005, 4 pages | http://www.gizmag.com/go/4494/ | Peugeot 20CUP Concept Car | Front Engine |
| 15 | Unknown Author, web page Polaris Slingshot company web page, Jun. 27, 2015, one page | http://www.polaris.com/en-us/slingshot | Polaris Slingshot | Front Engine |
| 16 | Ian Stent, CKC June 2012 Issue 63, pages 17-19 | http://www.grinnallcars.com/grin-factor.pdf | Grinnall Scorpion III | Rear Wheel Drive |
| 17 | Unknown Author, web page, The Petrol Stop, Jun. 27, 2015, 1 page | http://www.thepetrolstop.com/2012/03/ stimson-scorcher.html | Scorcher | Saddle seating |

What is claimed is:

1. A three wheel vehicle comprising:
two driven front wheels which allow primary directional control of the vehicle;
a single non-driven rear wheel;
a passenger compartment, the compartment comprising one or more passenger seats;
wherein the front wheels are located next to the side of the passenger seats in a transverse direction of the vehicle;
an engine or engines to propel the vehicle either directly or indirectly through the front wheels, the front of the forward most engine located behind the front of the forward most passenger seat; and
a drive train connecting the engine(s) to the driven wheels, the drive train located outside of or under the passenger compartment.

* * * * *